3,383,225
Patented May 14, 1968

3,383,225
ACID-RESISTANT ENAMELS
Norman H. Stradley, St. Paul, Minn., assignor to Minnesota Mining and Manufacturing Company, St. Paul, Minn., a corporation of Delaware
No Drawing. Continuation-in-part of application Ser. No. 545,537, Nov. 7, 1955. This application July 17, 1957, Ser. No. 672,357
14 Claims. (Cl. 106—48)

This application is a continuation-in-part of my application Ser. No. 545,537, filed Nov. 7, 1955, and now abandoned.

This invention broadly relates to acid-resistant enamels particularly suitable for aluminum and aluminum alloy base materials. More particularly, this invention is directed to low temperature maturing, high thermal expansion, acid-resistant, as well as alkali-resistant, enamels in the marketable form of porcelain enameling frits.

Compositions within my invention in the form of enamel glasses or frits are useful for providing crack-resistant and stain-resistant enamel coatings on a variety of metal and allied surfaces, and even may be used for coating kitchenware to provide decorative and easily cleaned surfaces. My enamels possess an unusually high resistance to attack by acids. In the acid resistance test described hereinafter, my enamels show only very low weight losses, i.e., weight losses less than about 0.06 gram per square inch of an enameled panel. Preferred enamels hereof, which are eminently suitable for providing decorative exterior coatings on kitchenware and structural panels, lose less than 0.03 gram per square inch of an enameled panel according to the acid resistance test described hereinafter. Such low weight losses are indicative of a highly acid-resistant enamel.

The enamels of this invention retain their original gloss and resist corrosion over lengthy periods of outdoor weathering. As a comparison, sample enameled aluminum panels of the prior art, exhibiting weight losses of about 0.15 to 0.20 gram according to the acid resistance test herein, were found to lose their gloss under outdoor exposure over a few months on a Houston, Tex. exposure rack, whereas similar panels enameled with the glass frits of this inveniton have effectively retained their initial gloss for as long as they have been exposed on the rack, i.e., almost two years as of the date of executing this present application.

In addition to the exceptional resistance to acid attack exhibited by my enamel compositions, their resistance to alkali attack is noteworthy, as will be described.

My enamel glass compositions may be fired at temperatures below approximately 600° C. In other words, they mature, i.e., fuse, at temperatures below about 600° C. Such low maturing temperatures are necessary for enamels applied to aluminum surfaces inasmuch as aluminum loses its structural strength when subjected to temperatures somewhat above 600° C.

Enamels for aluminum also must possess a reasonably high thermal coefficient of expansion in order to remain adherent and uncracked on such surfaces when subjected to variations in temperature. Enamels made from frit compositions hereof have suitable coefficients of thermal expansion for use on aluminum and, in fact, have thermal coefficients of expansion above $12 \times 10^{-6}$ per ° C., and as high as about $18 \times 10^{-6}$ per ° C., over the range of temperatures to which they are normally subjected in the form of decorative coatings on kitchenware or the like, i.e., from 50–350° C. My preferred frit compositions have a higher minimum thermal coefficient of expansion, i.e., above $14 \times 10^{-6}$ per ° C. between 50 and 350° C.

I have discovered that highly acid-resistant enamels suitable for decorative use on aluminum type kitchenware can be produced from a novel chemically-resistant alkali-titania-silicate system requiring a limited content of oxides of metals selected from Group II of Mendelyeev's Periodic Table. This discovery is my invention. While alkali-titania-silicate glasses are not new, none known to me other than those within my invention possess sufficient resistance to chemical attack so as to be suitable for various decorative uses on the exterior of such articles as aluminum cooking utensils or the like. Additionally, my enamels are useful for providing decorative coatings on aluminum-type structural panels. In such uses, the enamel coating must stand up for lengthy periods under weathering conditions. Tests indicate that my enamels will satisfy such requirements.

Coatings formed from my enamel frit compositions are especially hard, being harder, insofar as I am aware, than any other enamel designed for aluminum-type surfaces. Using my enamel frits, it is easy to form enamel coatings of a wide variety of colors, since most inorganic color pigments have been found to be compatible with the particular enamel compositions hereof. Also, my particular enamel compositions permit easy formation of white coatings having a high opacity.

Phosphors, e.g. zinc sulfide, may be incorporated in lead-free coatings formed using my enamel frit compositions to provide coatings of bright fluorescence, whereas lead oxide in phosphor-containing enamel coatings has been noted to cause degradation or inhibition of such fluorescing properties.

I am familiar with British Patent No. 665,903 to Fraser and Cianchi, published Jan. 30, 1952, directed to an enamel for aluminum. This patent points out that some titanium dioxide may be included in an enamel, and further teaches that rather large amounts of lead oxide and certain bivalent metal oxides are needed in the enamel. Contrary to this teaching, I have found that lead oxide is an unnecessary constituent in enamels for aluminum, and that it desirably is omitted from the composition. In my particular compositions, the various ingredients are so balanced that a small amount of lead oxide added thereto does not enhance the dissolving of titanium dioxide, even though lead oxide is a well known dissolver for titanium dioxide in certain compositions.

Additionally, I have found that enamels for aluminum surfaces can be formed so as to possess surprisingly high acid resistivity, as aforenoted, by employing only a very small but required amount of certain bivalent metal oxides (i.e., Group II oxides as hereinafter discussed). These oxides must be present in my frit compositions in only a critically small amount so that they serve as fluxing aids to dissolve large quantities of titanium dioxide into the glassy complex of my enamel frit. Larger amounts of these oxides than herein specified are to be avoided, since instead of functioning to aid in dissolving titanium dioxide into the glassy complex, they tend to cause it to be precipitated therefrom as a component of a crystalline phase, resulting in a loss of the required property of specified high acid resistivity for a coating. Thus, contrary to expectation, critically small amounts of these bivalent metal oxides greatly enhance acid resistivity apparently by actually dissolving titanium dioxide into the glassy frit complex and by maintaining most of it in solution, even during subsequent maturation of a coating, whereas larger amounts of these oxides have been noted to cause titanium dioxide to be largely precipitated in crystal form out of the glassy complex of the frit. While I do not wish to be bound by theory, I believe that when these bivalent metal oxides are present in larger amounts than herein specified, they tend to react with titanium dioxide to form a readily precipitated crystalline complex, whereas in small amount as hereinafter discussed, they fail to function in this manner and instead function with other ingredients of my frit composition to maintain titanium dioxide in complex glassy solution. The immediately preceding is the key point of my invention in its broadest aspect.

My frit compositions which possess properties satisfying such requirements as aforesetforth include a variety of inorganic constituents within certain defined approximate amounts, and characterized by certain general relationships. All percentage requirements set forth herein are in terms of mol percent of the total composition. My compositions contain from 25 to 50% $SiO_2$ and from 10 to 25% $TiO_2$. The ratio of the mol percent of $SiO_2$ to the mol percent of $TiO_2$ is between 1.4 and 5.0, and the total of $SiO_2$ and $TiO_2$ is between 45 and 60%. Included in my compositions is at least one $TiO_2$-dissolving oxide selected from the group consisting of CdO, ZnO, BaO, SrO, CaO, and MgO. The maximum amount of any one $TiO_2$-dissolving oxide in my compositions does not exceed about 8%, with the exception that CdO may be present up to 10%; and the total amount of the $TiO_2$-dissolving oxides should be maintained between about 2 and 10%. The total mol percent amount of $TiO_2$ and $TiO_2$-dissolving oxides in my compositions is maintained below the mol percent amount of $SiO_2$ therein. Alkali metal oxides are required approximately as follows: from 5 to 15% of $Li_2O$, from 2 to 13% of $K_2O$, and from 15 to 25% $Na_2O$, the total of $Li_2O$, $K_2O$ and $Na_2O$ being from 25 to 40%. $B_2O_3$ is maintained between 0.5 and 12%, while $P_2O_5$ may vary from 0 to 5%. The total $B_2O_3$ and any $P_2O_5$ varies from 1 to 12%. The foregoing enumerated constituents make up at least about 90 mol percent of the total frit composition. Small amounts of inorganic oxides other than those aforementioned may also be present in my frits without departing from the essential nature of the invention hereof, a principle well-recognized in the porcelain enamel art.

The various proportions and the relationship of the various essential constituents in the glass system of my enamels are considered critical in that proportions of constituents outside the aforementioned approximate ranges and a relationship of constituents not satisfying the foregoing criteria result in a loss of one or more of the properties aforesetforth for the aluminum enamels hereof. For example, an excess of $SiO_2$ (i.e., an amount in excess of the amount specified) raises the maturing temperature while a deficiency causes a loss of acid durability. $TiO_2$ greatly improves acid durability and surprisingly also causes a lowering of the maturing temperature of the enamel glass or frit but gives such a result only when present in the approximate amount and relationship as above specified. The mol percent amount of $TiO_2$ plus the total mol percent amount of oxides of metals selected from Group II of Mendelyeev's Periodic Table (i.e., CdO, ZnO, BaO, SrO, CaO, and MgO) must not exceed the total mol percent amount of $SiO_2$ in the composition. An excess of Group II metal oxides above the approximate amount specified causes a substantial decrease in acid durability.

For its high fluxing properties combined with its property of imparting acid resistance to my compositions, $Li_2O$ must be maintained within the approximate mol percent amounts specified. Larger amounts cause a loss of low temperature maturing properties. $K_2O$ is necessary for high thermal expansion but an excess above the amount specified pronouncedly lowers the acid durability of the enamel. $Na_2O$ is used with the other alkali metal oxides to improve fluxing and working characteristics of the enamel glass as well as to offset the tendency toward loss in durability caused by the rather high amounts of $K_2O$ required in my enamels for expansion properties. The total required alkali metal oxide content may be noted to be rather high in my enamels and, admittedly, is a rather surprising requirement for highly acid resistant enamels.

A small amount of the low temperature glassformer, $B_2O_3$, is necessary for desired maturing properties and glass formation, but an excess above about 12 mol percent greatly lowers durability. $P_2O_5$ is an optional constituent, and if present, it will not exceed about 5 mol percent of the total composition. While $P_2O_5$ is a well-known conventional low temperature glassformer, larger amounts than 5 mol percent in my compositions tend to cause a loss of gloss and of low temperature maturing properties in the inorganic system employed.

$F_2$ is not required constituent, but may be used in my compositions for fluxing purposes, if desired, in an amount no greater than 5 mol percent. It is usually added as NaF, in which case up to 10 mol percent of NaF (which is the equivalent of 5 mol percent of $F_2$) may be employed for the fluorine content. However, other alkali or alkaline earth fluorides in amounts giving an equivalent fluorine content may be used.

My preferred frit compositions have maturing temperatures below approximately 560° C., coefficients of thermal expansion above $14 \times 10^{-6}$ per ° C. between 50 and 350° C., and acid resistivities so great that they exhibit only a small weight loss of less than about 0.03 gram per square inch according to the acid test herein. They are in part characterized by a mol percent range for various constituents and proportion relationship based on total composition as follows: from 30 to 45% $SiO_2$, from 12 to 22% $TiO_2$, the ratio of $SiO_2$ to $TiO_2$ being from 1.8 to 3.5 and the total of $SiO_2$ and $TiO_2$ being between 48 and 60%, at least one $TiO_2$-dissolving oxide, in the indicated percentage range, selected from the group consisting of up to 10% CdO, up to 8% ZnO, up to 8% BaO, up to 8% SrO, up to 8% CaO, and up to 8% MgO, the total of said $TiO_2$-dissolving oxides being between 2 and 10%, the total mol percent amount of $TiO_2$ and $TiO_2$-dissolving oxides being less than the mol percent amount of $SiO_2$, and the ratio of the sum of the mol percent of $SiO_2$ and $TiO_2$ over the total mol percent of $TiO_2$-dissolving oxides being at least 6, from 6 to 13% of $Li_2O$, from 4 to 12% of $K_2O$, from 16 to 22% of $Na_2O$, the total of $Li_2O$, $K_2O$ and $Na_2O$ being between 30 and 40%, from 1 to 7% of $B_2O_3$, and from 0 to 3.5% $P_2O_5$, the total of $B_2O_3$ and any $P_2O_5$ being from 2 to 8%, the total of the foregoing constituents accounting for at least about 90% of the composition. As noted above, $F_2$ may be present in these compositions, if desired, in an amount up to 5 mol percent.

Additionally, in one embodiment of my invention directed to preferred enamels having extraordinarily high acid resistivities, a small amount of $Sb_2O_3$ up to about 1 mol percent is present. I have found that $Sb_2O_3$, among other things as will be explained, functions apparently to inhibit crystal growth and precipitation of crystals from my glassy enamels; and in this manner it serves to increase the acid resistance exhibited by the enamel. For example, composition number 30 in Table III is similar to composition number 26 except for a small amount of $Sb_2O_3$, which surprisingly increases the acid resistivity of the enamel composition.

In another embodiment of my invention directed to preferred enamels having extraordinarily high acid resistivities, at least two $TiO_2$-dissolving oxides are employed. They seem to behave synergistically in that when two or more are present, and the maximum amount of any one $TiO_2$-dissolving oxide is not in excess of 5%, glass enamel frits of this invention show improved acid resistivity as well as generally improved working characteristics during application and maturation of the enamel as a film coating. CdO in addition to promoting the solubility of $TiO_2$ in my glass frits as noted above, also promotes excellent adhesion of the resulting enamel to aluminum and stabilizes cadmium sulphoselenide pigments in the enamel so that bright red and yellow glossy enamel coatings can be formed.

Whenever CdO is omitted from compositions formed as set forth above, the resulting enamel coating exhibits somewhat less tenacious adherence to metal, particularly aluminum, than is satisfactory under most conditions of use. To gain satisfactory metal adherence, I may employ any adherence promoting oxide, or mixtures thereof, up to the total amount of 5 mol percent of the total composition. CdO, performing a distinctly different primary function (i.e., that of dissolving $TiO_2$) in my compositions, may additionally be present within the percent amount specified for that oxide in my compositions independently of the presence or absence of any other adherence promoters. Suitable adherence promoters are CuO, NiO, CoO, $Sb_2O_3$, PbO, $Bi_2O_3$ and mixtures thereof. With the exception of $Sb_2O_3$, which like CdO also performs another desired function in my frit compositions, these various adherence promoters may be employed in amounts up to 5 mol percent. Not more than about 1 mol percent of $Sb_2O_3$ should be employed because this oxide causes a loss of gloss in the resulting enamel. For this reason $Sb_2O_3$ is preferably, but not necessarily, employed with small amounts of another adherence promoter or with CdO present. By varying the amounts of CoO, CuO and NiO in the frit, various colors from deep-blue to blue to blue-green can be obtained in the frit and thus in the enamel coating. $Sb_2O_3$, PbO and $Bi_2O_3$ as adherence promoters permit the formation of colorless coats. PbO, of course, is generally not preferred as a constituent because it is a toxic material.

To prepare my glass enamel frits, raw batch materials, e.g., $CaCO_3$, $CaF_2$, $TiO_2$, etc., mixed in amounts calculated to give the mol percent analysis hereinbefore discussed, are melted together at a temperature range of about 1000° C. to 1200° C., and then quenched in water and dried. For example, a preferred frit composition having the analysis of Example 10 may be prepared by mixing 15.6 parts by weight of $TiO_2$, 1 part ZnO, 4.6 parts $BaCO_3$, 3 parts CdO, 6.7 parts $Li_2CO_3$, 7.7 parts of $Na_{12}P_{10}O_{31}$, 19.4 parts $Na_2CO_3$, 11.9 parts $K_2CO_3$, 1 part NaF, 22.7 parts $SiO_2$ and 6.4 parts $H_3BO_3$. After thoroughly mixing these materials, they are melted in a refractory vessel, such as an alumina-silicate vessel, at a furnace temperature of approximately 1100° C. The mass is heated until it melts down to a homogeneous fluid state, and then is quenched in water, which action shatters the glass into small particles. The frit is then dried and is ready for use in a slip formulation for enameling.

Slip formulations may be prepared by combining the frit hereof with water and suitable suspending and/or binding agents, i.e., sodium silicate, borax, etc., and then grinding the mixture to suitable fineness for smooth application to clean surfaces. To the slip formula may also be added coloring oxides, e.g., cobalt aluminate blue, nickel chromate green, etc., up to an amount of about 10% by weight of the slip formulation, if desired. Also, if desired, opacifying oxides such as $SnO_2$, $ZrO_2$, $TiO_2$, etc., may be additionally added up to an amount of about 15% by weight of the mill or slip formula. Small amounts of mill additives such as potassium dichromate may be desirably used to improve the surface appearance of fired enamel coatings, i.e., to provide coatings essentially free of pinholes and of improved tear and chip resistance. Slip formulations vary greatly and by using different formulations it is possible to vary somewhat the properties of a resulting enamel. One illustrative slip formulation is as follows: 100 parts of frit, 3.36 parts of potassium silicate powder (28.3% $K_2O$ and 70.7% $SiO_2$), 2.12 parts of KOH, 2.53 parts of $H_3BO_3$ and 50 cc. of water. Another is: 100 parts of frit, 9.1 parts of sodium silicate solution (8.9% $Na_2O$, 28.7% $SiO_2$, and 62.4% water), 5 parts of $K_2B_4O_7 \cdot 5H_2O$, 1.8 parts of KOH, and 50 cc. of water. A third is: 100 parts of frit, 4 parts of a water-soluble crushed glass mixture formed of 9.3% $Na_2O$, 34.7% $K_2O$, 25.5% $B_2O_3$, and 30.5% $SiO_2$, and 50 cc. of water. All three of these aforenoted slip formulations have been employed with my enamels with very successful results.

The following merely illustrates a further preferred slip formulation, as well as a suitable procedure for enameling: 100 grams of the frit of Example 10 were mixed in a ball mill with 2 grams of anhydrous borax, 1 gram of KOH, 3 grams of sodium meta-silicate (21.8% $Na_2O$, 21.1% $SiO_2$, 57.1% $H_2O$), and 50 cc. of water. (This particular slip formulation was used in making all specimen enameled panels for testing according to the acid resistance and alkali resistance tests described below.) The mixture was ground until the residue, after screening on a 325 mesh screen, was less than 1 gram per 50 cc. of slip. An aluminum alloy panel was cleaned by washing with carbon tetrachloride, dried, and sprayed with a sufficient amount of the slip to give a coating weight of 0.3 gram of enamel per square inch. Other methods of applying the slip to the panel are also suitable, methods such as dipping and electrostatic spraying included. The coated panel was then air dried to remove water and the piece fired at 520° C. for 10 minutes, resulting in the formation of a porcelain enamel coating free of surface defects such as for example pinholes, and possessing a high gloss, a high degree of adherence and a white semi-opaque color.

Aluminum alloy panels that contain large amounts of silicon, magnesium, etc., in the alloy are sometimes difficult to enamel unless a suitable oxide surface for enameling is first prepared. A suitable preliminary treating procedure for such panels is as follows: first clean organic matter from the panel by a soak period of about 3 to 4 minutes in trichloroethylene. Then dip the panel for about 2 minutes in a 5% sodium hydroxide solution held at about 180° F. Next rinse the panel thoroughly with water and dip it for about 2 minutes in a 30% nitric acid solution held at about 180° F. Following this, again rinse the panel in hot water and immerse it for about 10 minues in boiling water. Then dip it for about 2 minutes in a 5% potassium chromate solution held at about 180° F. or higher. Finally rinse the panel thoroughly and allow it to dry. The resulting cleaned panel may be enameled without difficulty according to well known procedures such as described above.

While primarily designed for application to aluminum-type surfaces, my enamels are also useful in coating such material as copper and silver. The relatively high dielectric constant of my enamel may render it particularly useful in the electrical industry.

In Tables I, II and III, various illustrative examples of this invention are set forth in terms of the mol percent analysis of inorganic constituents as calculated from the raw batch. Examples 5 through 10, inclusive, 12 through 24 inclusive, and 30, illustrate preferred frit compositions hereof.

In the row labeled "Acid test" are set forth the measured weight losses resulting from an acid resistance test which involves refluxing 25 ml. of boiling (100° C.) 6% citric acid (by weight) in contact with a 1" square area of an enameled panel having a coating weight of enamel of about .3 gram per square inch (which weight is well above the average coating weight employed commercially) for 2½ hours. (Of course, a larger area and proportionately larger quantity of 6% citric acid, etc., may be used in conducting the test; and thereafter, appropriate calculation made to reduce results to the standard herein set forth.) Specifically, in conducing the test, an enameled panel of adequate size is placed, enamel face upward, on a steel plate over a heating element. Over the enamel coating is rigged a bell jar (a jar having a small throat opening above and having its bottom removed) having a one square inch total open bottom area. A sealing gasket also having an opening of one square inch in total area is interposed between the enamel surface and the bottom edge of the bell jar. 25 ml. of hot 6% citric acid solution is then charged into the bell jar, a reflux condenser unit fitted over the throat opening of the jar, and boiling of the citric acid solution at 100° C. continued for 2½ hours. The enameled panel is weighed before and after the boiling acid treatment and the weight loss caused by the treatment is a rather accurate indication of what acid resistance the enamel coating will exhibit in practical uses. It also is a rather accurate indication of the weather resistance of the enamel.

In order for an enamel to be suitable for decorative exterior use on kitchenware, it should have an acid resistance, as measured according to the foregoing boiling citric acid test, exhibiting only a low weight loss of not more than about 0.03 gram per square inch. Porcelain enamel coats made using the preferred enamel frit compositions hereof can satisfy this requirement, and in addition, satisfy other requirements for aluminum-type enamels. To my knowledge no prior art alkali-titania-silicate enamel is suitable for such decorative use on aluminum type kitchenware. None known to me possesses sufficient resistance to acid attack in combination with other required properties.

The row labeled "Alkali test" contains the weight losses of the enamels according to an alkali resistance test comprising refluxing 25 ml. of a boiling (100° C.) solution of 5% hydrated sodium pyrophosphate $$(Na_4P_2O_7 \cdot 10H_2O)$$

by weight, in contact for 2½ hours with a one inch square enameled specimen panel, using the technique otherwise described for the acid resistance test above. My enamels all exhibit a high alkali resistance, according to this test, and in fact, exhibit weight losses less than about 0.05 gram per square inch of enameled panel. For preferred compositions, the alkali weight loss is less than about 0.03 gram per square inch of panel. This high alkali resistance is particularly noteworthy when it is found in combination with a high acid resistance, as it is in the case of the enamels taught herein.

The procedures followed for the "Acid test" and "Alkali test" herein set forth give results substantially the same as those obtained using procedures outlined in Commercial Standard CS100–47, recommended to industry in June of 1956 by the Quality Development Sub-Committee of the Aluminum Division, Porcelain Enamel Institute, Inc. as a tentative standard for evaluating the quality of porcelain enamel on aluminum.

Approximate maturing temperatures in degrees centigrade and coefficients of thermal expansion per ° C. from 50 to 350° C. are set forth for each glass frit.

Additionally certain ratios between ingredients for each composition are set forth in the tables.

TABLE I

| Ex. No | 1 | 2 | 3 | 4 | 5 | 6 | 7 | 8 | 9 | 10 |
|---|---|---|---|---|---|---|---|---|---|---|
| $SiO_2$ | 34 | 30 | 30 | 30 | 42.1 | 40.7 | 38 | 34.4 | 43.0 | 33 |
| $TiO_2$ | 21 | 16 | 16 | 16 | 12.7 | 17.1 | 21 | 17.7 | 13.0 | 17 |
| Total | 55 | 46 | 46 | 46 | 54.8 | 57.8 | 59 | 52.1 | 56.0 | 50 |
| CdO | 3 | 3 | 3 | 3 | 3.4 | 2.5 | 3 | 1.6 | 1.5 | 2 |
| ZnO | 3 | 3 | 3 | 3 | 2.0 | 2.5 | 3 | 1.1 | 2 | 1 |
| BaO | 3 | | | | 2.5 | 2.8 | 3 | 2.1 | 2.5 | 2 |
| SrO | | | | 3 | | | | | | |
| CaO | | 3 | | | | | | | | |
| MgO | | | 3 | | | | | | | |
| Total Group II | 9 | 9 | 9 | 9 | 7.9 | 7.8 | 9 | 4.8 | 6.0 | 5 |
| $Li_2O$ | 10 | 13 | 13 | 13 | 6.4 | 8.5 | 10 | 8.3 | 6.5 | 8 |
| $K_2O$ | 4 | 6 | 6 | 6 | 4.9 | 5.3 | 4 | 7.8 | 5.0 | 7.5 |
| $Na_2O$ | 16 | 20 | 20 | 20 | 18.6 | 17.6 | 16 | 20.8 | 19.0 | 20 |
| NaF | | | | | 2.0 | | | | 2.0 | 2 |
| Total | 30 | 39 | 39 | 39 | 31.9 | 31.4 | 30 | 36.9 | 32.5 | 37.5 |
| $B_2O_3$ | 6 | 4 | 4 | 4 | 3.4 | 3.0 | 2 | 3.1 | 3.5 | 4.5 |
| $P_2O_5$ | | 2 | 2 | 2 | 2.0 | | | 3.1 | 2 | 3 |
| Total | 6 | 6 | 6 | 6 | 5.4 | 3.0 | 2 | 6.2 | 5.5 | 7.5 |
| Ratio $SiO_2/TiO_2$ | 1.62 | 1.88 | 1.88 | 1.88 | 3.31 | 2.38 | 1.88 | 1.94 | 3.31 | 1.94 |
| Ratio $TiO_2$/Total Group II | 2.33 | 1.78 | 1.78 | 1.78 | 1.61 | 2.19 | 2.33 | 3.69 | 2.17 | 3.4 |
| Ratio $TiO_2+SiO_2$/Total Group II | 6.11 | 5.11 | 5.11 | 5.11 | 6.94 | 7.41 | 5.57 | 10.86 | 9.3 | 10.0 |
| Acid test | .037 | .047 | .031 | .033 | .009 | .018 | .027 | .021 | .007 | .024 |
| Alkali test | .034 | .048 | .034 | .036 | .029 | .016 | .014 | .020 | .010 | .025 |
| a | 560 | 530 | 550 | 540 | 560 | 540 | 560 | 540 | 560 | 520 |
| b | 15.0 | 16.3 | 15.1 | 14.8 | 14.3 | 14.6 | 15.1 | 15.4 | 14.7 | 16.1 |

See footnotes at end of Table III.

TABLE II

| Ex. No | 11 | 12 | 13 | 14 | 15 | 16 | 17 | 18 | 19 | 20 |
|---|---|---|---|---|---|---|---|---|---|---|
| $SiO_2$ | 36.2 | 38.0 | 34.4 | 42.1 | 34.4 | 33.7 | 34.4 | 33.7 | 35.6 | 42.5 |
| $TiO_2$ | 14.7 | 15.4 | 17.7 | 12.7 | 17.7 | 17.3 | 17.7 | 17.3 | 15.8 | 12.8 |
| Total | 50.9 | 53.4 | 52.1 | 54.8 | 52.1 | 51.0 | 52.1 | 51.0 | 51.4 | 55.3 |
| $SnO_2$ | 2.9 | 3.0 | | | | | | | | |
| CdO | | | | | | | | | 1 | 2 |
| ZnO | 1.7 | 1.8 | 1.1 | 2 | 1.1 | 1 | 1.1 | 1 | 1 | 2 |
| BaO | | | 2.1 | 2.5 | 2.1 | 2.1 | 2.1 | 2.1 | 2 | 2.5 |
| SrO | .6 | .6 | | | | | | | | |
| Total Group II | 2.3 | 2.4 | 3.2 | 4.5 | 3.2 | 3.1 | 3.2 | 3.1 | 4 | 6.5 |
| $Li_2O$ | 7.2 | 7.5 | 8.3 | 6.4 | 8.3 | 8.2 | 8.3 | 8.2 | 6.9 | 6.4 |
| $K_2O$ | 7.6 | 7.9 | 7.8 | 4.9 | 7.8 | 7.7 | 7.8 | 7.7 | 7.9 | 4.9 |
| $Na_2O$ | 17.1 | 18.0 | 20.8 | 18.6 | 20.8 | 20.4 | 20.8 | 20.4 | 18.8 | 18.8 |
| NaF | | | | 2 | | | | | 4 | 2 |
| Total | 31.9 | 33.4 | 36.9 | 31.9 | 36.9 | 36.3 | 36.9 | 36.3 | 37.6 | 32.1 |
| $B_2O_3$ | 11.0 | 6.7 | 3.1 | 3.4 | 3.1 | 3.0 | 3.1 | 3.0 | 4 | 3.4 |
| $P_2O_5$ | 1.0 | 1.1 | 3.1 | 2 | 3.1 | 3.0 | 3.1 | 3.0 | 2 | 2 |
| Total | 12.0 | 7.8 | 6.2 | 5.4 | 6.2 | 6.0 | 6.2 | 6.0 | 6 | 5.4 |
| CuO | | | | | 1.6 | 3.4 | | | | |
| NiO | | | | | | | 1.6 | 3.6 | | |
| CoO | | | | | | | | | 1.6 | 3.6 |
| $Sb_2O_3$ | | | | | | | | | 1 | .7 |
| Total | | | | | 1.6 | 3.4 | 1.6 | 3.6 | 1.6 | 3.6 | 1 | .7 |

TABLE II—Continued

| Ex. No | 11 | 12 | 13 | 14 | 14 | 16 | 17 | 18 | 19 | 20 |
|---|---|---|---|---|---|---|---|---|---|---|
| Ratio $SiO_2/TiO_2$ | 2.44 | 2.46 | 1.94 | 3.31 | 1.94 | 1.95 | 1.94 | 1.95 | 2.25 | 3.32 |
| Ratio $TiO_2$/Total Group II | 6.39 | 6.42 | 5.53 | 2.82 | 5.53 | 5.58 | 5.53 | 5.58 | 3.95 | 1.97 |
| Ratio $TiO_2+SiO_2$/Total Group II | 22.0 | 22.3 | 16.3 | 12.2 | 16.3 | 16.5 | 16.3 | 16.5 | 12.9 | 8.51 |
| Acid test | .044 | .027 | .018 | .010 | .021 | .022 | .015 | .021 | .027 | .012 |
| Alkali test | 0.30 | .025 | .011 | .012 | .023 | .022 | .016 | .017 | .013 | .017 |
| a | 540 | 540 | 540 | 560 | 540 | 540 | 540 | 540 | 530 | 550 |
| b | 13.7 | 14.8 | 15.5 | 14.0 | 17.6 | 16.8 | 15.4 | 16.3 | 15.6 | 14.1 |

See footnotes at end of Table III.

TABLE III

| Ex. No | 21 | 22 | 23 | 24 | 25 | 26 | 27 | 28 | 29 | 30 |
|---|---|---|---|---|---|---|---|---|---|---|
| $SiO_2$ | 34.4 | 42.1 | 34.4 | 33.7 | 49.3 | 36.2 | 36.0 | 36.2 | 36.2 | 36.0 |
| $TiO_2$ | 17.7 | 12.7 | 17.7 | 17.3 | 10.0 | 14.7 | 14.1 | 14.7 | 14.7 | 14.6 |
| Total | 52.1 | 54.8 | 52.1 | 51.0 | 59.3 | 50.9 | 50.1 | 50.9 | 50.9 | 50.6 |
| CdO | | | | | 3 | 7 | 9.9 | | | 7 |
| ZnO | 1.1 | 2 | 1.1 | 1 | 3 | | | | | |
| BaO | 2.1 | 2.5 | 2.1 | 2.1 | 3 | | .1 | 7 | | |
| CaO | | | | | | | | | 7 | |
| Total Group II | 3.2 | 4.5 | 3.2 | 3.1 | 9 | 7 | 10.0 | 7 | 7 | 7 |
| $Li_2O$ | 8.3 | 6.4 | 8.3 | 8.2 | 6.3 | 8 | 7.5 | 8 | 8 | 8 |
| $K_2O$ | 7.8 | 4.9 | 7.8 | 7.7 | 2.0 | 7 | 7.9 | 7 | 7 | 7 |
| $Na_2O$ | 20.8 | 18.6 | 20.8 | 20.4 | 18.2 | 20.3 | 17.0 | 20.3 | 20.3 | 20.2 |
| NaF | | 2 | | | | | | | | |
| Total | 36.9 | 31.9 | 36.9 | 36.3 | 26.5 | 35.3 | 32.4 | 35.3 | 35.3 | 35.2 |
| $B_2O_3$ | 3.1 | 3.4 | 3.1 | 3.0 | 2.8 | 5 | 5.8 | 5 | 5 | 5 |
| $P_2O_5$ | 3.1 | 2 | 3.1 | 3.0 | 2.0 | 1.8 | 1.7 | 1.8 | 1.8 | 1.8 |
| Total | 6.2 | 5.4 | 6.2 | 6.0 | 4.8 | 6.8 | 7.5 | 6.8 | 6.8 | 6.8 |
| $Sb_2O_3$ | | | | | .4 | | | | | .4 |
| PbO | 1.6 | 3.4 | | | | | | | | |
| $Bi_2O_3$ | | | 1.6 | 3.6 | | | | | | |
| Total | 1.6 | 3.4 | 1.6 | 3.6 | .4 | | | | | .4 |
| Ratio $SiO_2/TiO_2$ | 1.94 | 3.31 | 1.94 | 1.95 | 4.93 | 2.46 | 2.55 | 2.46 | 2.46 | 2.46 |
| Ratio $TiO_2$/Total Group II | 5.53 | 2.82 | 5.53 | 5.58 | 1.11 | 2.10 | 1.41 | 2.10 | 2.10 | 2.08 |
| Ratio $TiO_2+SiO_2$/Total Group II | 16.3 | 12.2 | 16.3 | 16.5 | 6.59 | 7.28 | 5.01 | 7.28 | 7.28 | 7.24 |
| Acid test | .022 | .008 | .024 | .028 | .059 | .039 | .035 | .063 | .033 | .028 |
| Alkali test | .019 | .022 | .009 | .013 | .020 | .042 | .038 | .030 | .038 | .031 |
| a | 540 | 550 | 540 | 540 | 580 | 540 | 540 | 540 | 540 | 540 |
| b | 16.2 | 14.5 | 16.6 | 16.4 | 12.6 | 16.5 | 16.4 | 17.5 | 17.0 | 16.1 | a = Maturing Temperature in degrees centigrade.
b = Coefficient of thermal expansion per ° C. between 50 and 350° C. (Values set forth are $10^{-6}$ times actual values.)

That which is claimed is:

1. A frit particularly adapted for application to surfaces of the aluminum type, characterized by being maturable into a smooth uniform enamel coating at temperatures below approximately 600° C., exhibiting a coefficient of thermal expansion above $12 \times 10^{-6}$ per ° C. between 50 and 350° C., and possessing a high resistance to acid attack, as determined by the acid test herein defined, giving a weight loss of less than about 0.06 gram per square inch of an enameled panel, said frit comprising, in terms of essential oxide constituents set forth in mol percent of the total composition, from 25 to 50% $SiO_2$, from 10 to 25% $TiO_2$, the ratio of $SiO_2$ to $TiO_2$ being from 1.4 to 5 and the total of $SiO_2$ and $TiO_2$ being between 45 and 60%, at least one $TiO_2$-dissolving oxide, in the indicated percentage range, selected from the group consisting of 0 to 10% CdO, 0 to 8% ZnO, 0 to 8% BaO, 0 to 8% SrO, 0 to 8% CaO, and 0 to 8% MgO, the total of said $TiO_2$-dissolving oxides being between 2 and 10%, the total mol percent amount of $TiO_2$ and $TiO_2$-dissolving oxides being less than the mol percent amount of $SiO_2$, from 5 to 15% of $Li_2O$, from 2 to 13% of $K_2O$, from 15 to 25% $Na_2O$, the total of $Li_2O$, $K_2O$ and $Na_2O$ being from 25 to 40%, from 0.5 to 12% of $B_2O_3$, from 0 to 5% of $P_2O_5$, the total of $B_2O_3$ and any $P_2O_5$ being from 1 to 12%, and the mol percent of $TiO_2$ in the said composition being greater than the mol percent of $B_2O_3$ therein, the foregoing enumerated constituents totalling at least about 90 mol percent of the frit.

2. The frit of claim 1 containing fluorine in an amount up to the equivalent of 5 mol percent of $F_2$.

3. The frit of claim 1 containing in addition at least one adherence promoting oxide in the approximate indicated mol percent proportion selected from the group consisting of 0 to 5% CuO, 0 to 5% NiO, 0 to 5% CoO, 0 to 1% $Sb_2O_3$, 0 to 5% PbO and 0 to 5% $Bi_2O_3$, the total amount of said adherence promoting group being up to approximately 5 mol percent of the frit.

4. A frit particularly adapted for application to surfaces of the aluminum type, characterized by being maturable into a smooth uniform enamel coating at temperatures below approximately 560° C., exhibiting a coefficient of thermal expansion above $14 \times 10^{-6}$ per ° C. between 50 and 350° C., and possessing a high resistance to acid attack, as determined by the acid test herein defined, giving a weight loss of less than about 0.03 gram per square inch of an enameled panel, said frit comprising, in terms of essential oxide constituents set forth in mol percent of the total composition, from 30 to 45% $SiO_2$, from 12 to 22% $TiO_2$, the ratio of $SiO_2$ to $TiO_2$ being from 1.8 to 3.5 and the total of $SiO_2$ and $TiO_2$ being between 48 and 60%, at least one $TiO_2$-dissolving oxide selected from the group consisting of 0 to 10% CdO, 0 to 8% ZnO, 0 to 8% BaO, 0 to 8% SrO, 0 to 8% CaO, and 0 to 8% MgO, the total of said $TiO_2$-dissolving oxides being between 2 and 10%, the total mol percent amount of $TiO_2$ and $TiO_2$-dissolving oxides being less than the mol percent amount of $SiO_2$, and the ratio of the sum of the mol percent of $SiO_2$ and $TiO_2$ over the mol percent of $TiO_2$-dissolving oxides being at least 6, from 6 to 13% of $Li_2O$, from 4 to 12% of $K_2O$, from 16 to 22% of $Na_2O$, the total of $Li_2O$, $K_2O$, and $Na_2O$ being between 30 and 40%, from 1 to 7% $B_2O_3$, from 0 to 3.5% $P_2O_5$, the total of $B_2O_3$ and any $P_2O_5$ being from 2 to 8%, the foregoing enumerated constituents totalling at least about 90 mol percent of the frit, and a small amount of $Sb_2O_3$ up to about 1 mol percent of said frit.

5. A frit particularly adapted for application to surfaces of the aluminum type, characterized by being maturable into a smooth uniform enamel coating at temperatures below approximately 560° C., exhibiting a coefficient of thermal expansion above $14 \times 10^{-6}$ per ° C. between 50 and 350° C., and possessing a high resistance to acid attack, as determined by the acid test herein defined, giving a weight loss of less than about 0.03 gram per square inch of an enameled panel, said frit comprising, in terms of essential oxide constituents set forth in mol percent of the total composition, from 30 to 45% $SiO_2$, from 12 to 22% $TiO_2$, the ratio of $SiO_2$ to $TiO_2$ being from 1.8 to 3.5 and the total of $SiO_2$ and $TiO_2$ being between 48 and 60%, at least two $TiO_2$-dissolving oxides selected from the group consisting of CdO, ZnO, BaO, SrO, CaO, and MgO, the maximum amount of any one $TiO_2$-dissolving oxide not exceeding 5% and the total of said $TiO_2$-dissolving oxides being between 2 and 10%, the total mol percent amount of $TiO_2$ and $TiO_2$-dissolving oxides being less than the mol percent amount of $SiO_2$, and the ratio of the sum of the mol percent of $SiO_2$ and $TiO_2$ over the mol percent of $TiO_2$-dissolving oxides being at least 6, from 6 to 13% of $Li_2O$, from 4 to 12% of $K_2O$, from 16 to 22% of $Na_2O$, the total of $Li_2O$, $K_2O$, and $Na_2O$ being between 30 and 40%, from 1 to 7% $B_2O_3$, from 0 to 3.5% $P_2O_5$, the total of $B_2O_3$ and any $P_2O_5$ being from 2 to 8%, the foregoing enumerated constituents totalling at least about 90 mol percent of the frit.

6. The frit of claim 5 containing fluorine in an amount up to the equivalent of 5 mol percent of $F_2$.

7. The frit of claim 5 containing in addition at least one adherence promoting oxide in the approximate indicated mol percent proportion selected from the group consisting of 0 to 5% CuO, 0 to 5% NiO, 0 to 5% CoO, 0 to 1% $Sb_2O_3$, 0 to 5% PbO and 0 to 5% $Bi_2O_3$, the total amount of said adherence promoting group being up to 5 mol percent of the frit.

8. As a new enameled article of manufacture: a base structure having a metal surface high in aluminum content and a fused acid-resistant porcelain enamel coating adhered to said base structure, said enamel being formed from a frit having the composition of claim 1.

9. As a new enameled article of manufacture: a base structure having a metal surface high in aluminum content and a fused acid-resistant porcelain enamel coating adhered to said base structure, said enamel being formed from a frit having the composition of claim 2.

10. As a new enameled article of manufacture: a base structure having a metal surface high in aluminum content and a fused acid-resistant porcelain enamel coating adhered to said base structure, said enamel being formed from a frit having the composition of claim 3.

11. As a new enameled article of manufacture: a base structure having a metal surface high in aluminum content and a fused acid-resistant porcelain enamel coating adhered to said base structure, said enamel being formed from a frit having the composition of claim 4.

12. As a new enameled article of manufacture: a base structure having a metal surface high in aluminum content and a fused acid-resistant porcelain enamel coating adhered to said base structure, said enamel being formed from a frit having the composition of claim 5.

13. As a new enameled article of manufacture: a base structure having a metal surface high in aluminum content and a fused acid-resistant porcelain enamel coating adhered to said base structure, said enamel being formed from a frit having the composition of claim 6.

14. As a new enameled article of manufacture: a base structure having a metal surface high in aluminum content and a fused acid-resistant porcelain enamel coating adhered to said base structure, said enamel being formed from a frit having the composition of claim 7.

References Cited

UNITED STATES PATENTS

| | | | |
|---|---|---|---|
| 2,909,438 | 10/1959 | Kantz | 106—48 |
| 2,842,458 | 7/1958 | Feeney et al. | 106—48 |
| 2,414,633 | 1/1947 | Bryant | 106—48 |
| 2,492,523 | 12/1949 | Coffeen et al. | 106—49 |
| 2,604,410 | 7/1952 | Bryant | 106—48 |
| 2,660,531 | 11/1953 | Fraser et al. | 106—48 |
| 2,662,020 | 12/1953 | Schofield et al. | 106—48 |
| 2,911,312 | 11/1959 | Hoffman | 106—48 |

FOREIGN PATENTS 665,903   1/1952   Great Britain.

HELEN M. McCARTHY, *Primary Examiner.*

JOHN R. SPECK, *Examiner.*

D. J. ARNOLD, R. E. JONES, *Assistant Examiners.*